United States Patent [19]
Sasakura et al.

[11] 3,731,488
[45] May 8, 1973

[54] METHOD OF CONDENSING TURBINE EXHAUST AT THE POWER PLANT

[75] Inventors: Tetsugoro Sasakura, Nishinomiya, Seishi Moriya, Kobe, both of Japan

[73] Assignee: Sasakura Engineering Co., Ltd., Osaka, Japan

[22] Filed: June 25, 1971

[21] Appl. No.: 156,718

[30] Foreign Application Priority Data

June 30, 1970 Japan ..........................45/57535

[52] U.S. Cl...........................................60/95, 165/10
[51] Int. Cl...................................................F01k 9/00
[58] Field of Search ....................60/94, 95; 165/110

[56] References Cited

UNITED STATES PATENTS

| | | | |
|---|---|---|---|
| 3,293,850 | 12/1966 | Morrison | 60/36 |
| 3,635,042 | 1/1972 | Spangemacher | 62/314 |
| 3,660,980 | 5/1972 | Knirsch | 165/113 |

Primary Examiner—Martin P. Schwadron
Assistant Examiner—Allen M. Ostrager
Attorney—E. F. Wenderoth et al.

[57] ABSTRACT

A method of condensing the turbine exhaust at a power plant, characterized in that the turbine exhaust is introduced into a direct-contact type condenser which works under a vacuum condition and is condensed by its direct contact with cooling water. Mixed water of the cooling water and condensed water is drawn out of said condenser, a part of the mixed water is cooled by an air-cooled heat exchanger and is further cooled by a heat exchange with liquefied gas down below a temperature corresponding to the degree of vacuum of said condenser for circulation and use as cooling water for said condenser. The remainder is returned to the feed water system of the boiler and the gas vaporized by the afore-mentioned heat exchange is used as boiler fuel.

1 Claim, 1 Drawing Figure

Patented May 8, 1973  3,731,488
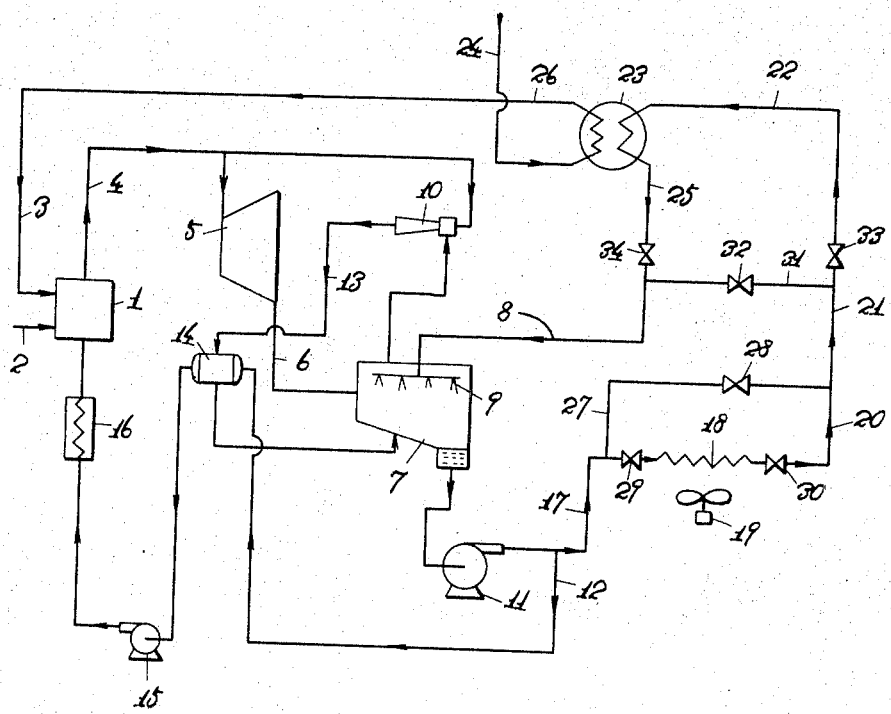
TETSUGORO SASAKURA and
SEISHI MORIYA,
INVENTORS
BY Wendmoth Lind & Ponack
ATTORNEYS

METHOD OF CONDENSING TURBINE EXHAUST AT THE POWER PLANT

This invention relates to an improved method of condensing turbine exhaust at a power plant.

With a sharp increase in the demand for electric power in recent years, the necessity of constructing power plants has increased more and more. On the other hand, occurrence of public hazards at industrial facilities has been taken up as a serious problem and the construction of power plants has been restricted from this aspect. As a matter of fact, difficulty has been found in selecting the building site for a new power plant.

In Japan, it is usual that power plants are constructed at coastal areas for various reasons and turbine exhaust or steam which was once used for driving of the turbine for power generation is condensed under a vacuum condition by a condenser of the non-direct contact type which uses sea water as cooling water and water of condensation is returned to the water supply system of the boiler, but cooling sea water whose temperature rose in the condenser is discharged as it is into the sea. This method, however, results in impeding the normal breeding and existence of living things in the sea by the discharge of high temperature brine and affects adversely the fishing in the neighboring coastal area, raising the serious problem of the power plant being a public hazzard.

As a means of preventing the problem caused by hot sea water, there has been known a method of using air, instead of the sea water, as cooling fluid to condense the turbine exhaust. Under this method, however, the steam to be condensed is passed in the condensing pipe of an air-cooled condenser involves a bigger pressure drop of steam flow, making it impossible to keep steam space in the condenser at a high degree of vacuum. Therefore, such a method cannot be applied to a plant of large capacity and of high efficiency where high vacuum is required, but is applicable only to a plant of small capacity and of low efficiency. Moreover, in the case where the sea water is used as cooling water, a condenser and parts thereof must be made of high anti-corrosive structural material which is costly.

Heavy oil or crude oil is used at the power plant as fuel. However, it is an established fact that these fuel oils generally contain several per cent sulfur, which remains in the combustion gas and pollutes the atmosphere, causing a serious air pollution. For the purpose of preventing this air pollution, various studies have been made on desulfurization of fuel oil or combustion gas. This desulfurization method has been put in practical use at some of the power plants but still involves technical difficulties and high treating costs. One of the recent suggestions is a method of burning only the liquefied gas, such as liquefied natural gas, or burning the liquefied gas and heavy oil together. However, liquefied gas generally costs more than heavy oil and the use of the former is restricted from a cost point of view.

With the above situation in view, this invention has for an object to provide an improved method of condensing the turbine exhaust, in which liquefied gas fuel is used effectively by utilizing the heat of vaporization of liquefied gas positively and effectively, thereby contributing to solving the problem of danger to marine life due to discharge of high temperature cooling sea water and also contributing to preventing air pollution resulting from sulfur in combustion gas.

Now, a description is made below of the present invention in reference to the attached drawing showing an embodiment of the present invention.

The present invention is not limited to the following description and the accompanying drawing but its technical scope is as defined in the claims to be made hereinafter.

Heavy oil or crude oil is fed to a boiler 1 by way of a pipe 2. Also, vaporized fuel gas is fed to the boiler 1 via a pipe 3. Steam of high temperature and high pressure generated in said boiler drives, through the medium of a pipe 4, a turbine 5 of a generator (not shown in the drawing). Exhaust steam of low temperature and low pressure from the turbine 5 is introduced into a direct-contact type condenser 7 through a pipe 6, and makes direct contact with cooling water which jets from a nozzle 9 through a pipe 8 and drops, whereupon it condenses. The pressure in the afore-mentioned direct-contact type condenser 7 is kept at high vacuum (usually about 40mmHg abs.) by a steam ejector 10 so as to raise the efficiency of the turbine 5.

The cooling water fed through the pipe 8 is cooled down (by the method to be described hereinafter) to the saturated temperature (about 34°C in the case where the degree of vacuum is 40mmHg abs.) which corresponds to the degree of vacuum in the condenser and is introduced into the direct-contact type condenser 7. Mixed water of the condensed water and cooling water thus generated is drawn out by a pump 11 and a part of it branches to a pipe 12 and is used as cooling water for an ejector condenser 14 connected to an exhaust pipe 13 of the ejector 10 and is returned into the boiler 1, via a pump 15 and a feed water heater 16. As in the case of the conventional feed water system of the boiler, this reflux line is provided with feed water treating apparatuses, such as introduction of supplementary water, a de-aerator, etc.

The remainder of the mixed water drawn out of the pump 11 branches to a pipe 17 and is used as cooling water for the direct-contact type condenser 7. In this case, however, the temperature of said cooling water at the entrance of the condenser must be lower than the temperature which corresponds to the degree of vacuum of the direct-contact type condenser 7. Cooling for this purpose is effected by air-cooling and by cooling by the heat of vaporization of the liquefied gas fuel. Liquefied gas fuel, such as liquefied natural gas, must be vaporized before it is fed to the boiler. The method according to the present invention as shown by the accompanying drawing utilizes positively and effectively a large quantity of heat of vaporization which is necessary for vaporization.

The mixed water branched into the pipe 17 is cooled down in an air-cooled heat exchanger 18 by the air supplied from a fan 19. This air-cooled heat exchanger is of such type that fluid to be cooled flows in many heat-transmission pipes having fins at their outer surfaces and cooling is effected by the air which passes the outer surfaces of the pipes. However, heat exchangers of other types may also be used.

In the case of cooling by air, it is quite impossible to drop the temperature below the atmospheric temperature. The said mixed water which was cooled by the air down to a temperature slightly above the atmospheric temperature is put in a liquefied gas vaporizer 23, by way of a pipe 20, a pipe 21 and a pipe 22, where it exchanges heat with liquefied gas to be introduced from a pipe 24 and imparts the heat of vaporization to said liquefied gas, while the mixed water itself is cooled down. The boiling point of liquefied gas fuel (a temperature at which it is vaporized) is low and its heat quantity of vaporization is large (in the case of methane which is a principal component of liquefied natural gas, the boiling point is −161°C and the quantity of heat of vaporization is 1.955 K Cal/mol.). Therefore, said mixed water which was cooled don to the temperature slightly above the atmospheric temperature could be cooled down further by giving heat of vaporization to the liquefied gas fuel. The mixed water whose temperature is thus dropped below the temperature in the direct-contact type condenser 7 is introduced into the said condenser as cooling water, via a pipe 25 and the pipe 8 and effects condensing of the turbine exhaust. A part of the mixed water is re-circulated into the aforementioned circuit through the pump 11.

On the other hand, liquefied gas fuel vaporized in the liquefied gas vaporizer 23 is fed to the boiler 1 and other consuming equipment via a pipe 26 and the pipe 3.

The quantity of liquefied gas to be vaporized by the liquefied gas vaporizer 23 or the quantity of heat of vaporization to be given to said gas varies with the mixing ratio of liquefied gas and heavy oil or crude oil to be burnt in the boiler 1, or with other factors, such as the load of the power plant. The quantity of turbine exhaust to be condensed by the condenser 7 varies with the load of the power plant and other factors. Also, the quantity of heat exchange in the air-cooled heat exchanger 18 varies with the atmospheric temperature, etc. The adjustment of the aforementioned circulating cooling water circuit according to such variations could be effected properly by adjusting a valve 28, a valve 29 and a valve 30 of a by-pass piping 27 of the air-cooled heat exchanger 18, by adjusting the quantity of air flow from the fan 19 and by adjusting a valve 33, a valve 34 and a valve 32 of a by-pass piping 31 of the vaporizer 23.

According to the above method, turbine exhaust is condensed only with water circulating in the prescribed circuit and therefore the system is entirely free from cooling water of high temperature being discharged out of the system and thus heat of vaporization of liquefied fuel is utilized positively and adjustments to cope with varying conditions can be effected with ease.

As afore-mentioned, it is impossible to cool the mixed water branched to the pipe 17 from the pump 11 down to the temperature below the atmospheric temperature by the air-cooled heat exchanger 18 alone. However, in a cold area where the atmospheric temperature is always much lower than the temperature in the condenser 7, the temperature of said mixed water could be lowered to a temperature at which cooling water for the condenser 7 must be maintained. In this instance, the total quantity of mixed water which is branched to the pipe 17 from the pump 11 and passes through the air-cooled heat exchanger 18 is introduced into the condenser 7 as cooling water, via the bypass piping 31 and the pipe 8. Thus, the mixed water circulates in this circuit.

The above method is applicable to the power plant where heavy oil or crude oil is used exclusively. As compared with the method in which turbine exhaust is cooled directly by the air, under the method according to the present invention cooled water passes through the air-cooled heat exchanger and steam is condensed in the direct-contact type condenser. Accordingly, there is caused no lowering of the degree of vacuum of the condenser due to flow resistance of steam and it is possible to apply the method according to the present invention to a plant of high efficiency, for which high vacuum is required. This method has of course an important advantage in that it is free from the cooling water of high temperature being discharged out of the system. If the quantity of liquefied gas fuel used is large and the vaporization heat quantity corresponds with the heat quantity required for condensation of turbine exhaust, it is unnecessary to use an air-cooled heat exchanger. In this case, the mixed water branched to the pipe 17 from the pump 11 goes, through pipes 27, 21 and 22, into the liquefied gas vaporizer 23 where it gives heat of vaporization to the liquefied gas, whereby its temperature is lowered, and is introduced into the direct-contact type condenser 7, via pipes 25 and 8, as cooling water. Thus, the circulation is repeated. However, in the case where the vaporization heat quantity of liquefied gas is excessively large, it will become necessary to provide the liquefied gas line with a vaporizer (not shown in the drawing) which uses proper heat exchanging medium, besides the vaporizer 23. This method also does not involve discharge of high temperature cooling water out of the system and can utilize the heat of vaporization of liquefied gas to the best advantage.

According to the present invention, condensation of turbine exhaust is effected only by cooling with water circulating in the system thus avoiding the need for using external water, such as sea water. Thus, pollution of the sea, such as causing hot sea water, resulting in danger to breeding and existence of living things in the sea due to discharge of high temperature brine and the resultant adverse effect on the fishery in the neighboring coastal area, is eliminated. Moreover, since the present invention utilizes the heat of vaporization of liquefied natural gas positively and effectively, which has so far been discarded, use of liquefied gas fuel such as liquefied natural gas which has no sulfur content is made practicable, although it is relatively high in cost, it contributes to preventing the pollution of the atmosphere and is effective for promoting the construction plan of a power plant. In addition, as compared with the case where the sea water is used as a cooling medium, the method according to the present invention dispenses with the use of high-corrosive structural material which is expensive for the condenser and other parts. Thus, this method is advantageous from the aspects of economy and durability of the apparatus.

Furthermore, even when liquefied gas is not used as fuel, this invention provides a method of condensing turbine exhaust which can be applied to a power plant of high efficiency in the cold area, without discharging of high temperature cooling water, including cooling sea water. The use of a direct-contact type condenser produces the cooling effect even if the difference in temperature between exhaust steam and cooling water is little. Therefore, this method involves little loss of pressure, is suitable for maintaining high vacuum and makes it possible to keep the condensing efficiency at a high degree.

What is claimed is:

1. A method of condensing the steam turbine exhaust at a power plant, said method comprising the steps of:

introducing said turbine exhaust into a direct contact type condenser, thereby condensing said turbine exhaust by direct contact with cooling water in said condenser, and thus forming a mixture of condensed exhaust and cooling water;

withdrawing said mixture from said condenser;

passing a first portion of said mixture through an air-cooled first heat exchanger, thereby cooling said first portion to a first temperature;

then passing said first portion of said mixture through a second heat exchanger and further cooling said mixture, by heat exchanger with a liquefied gas, thereby vaporizing said gas, to below a second temperature corresponding to that temperature required to maintain a predetermined degree of vacuum within said condenser;

then passing said first portion of said mixture into said condenser and using said mixture as said cooling water;

passing a second portion of said mixture to a boiler of said power plant; and passing said vaporized gas to said boiler for use as a fuel therein.

* * * * *